United States Patent [19]

Kazaitis

[11] 4,439,890
[45] Apr. 3, 1984

[54] SYNTHETIC FOOD CASING ARTICLE EMPLOYING A RIGID HOLLOW TUBULAR CORE MEMBER WITH INTEGRAL CASING RETENTION ELEMENT

[75] Inventor: Michael P. Kazaitis, Chicago, Ill.

[73] Assignee: Union Carbide Corporation, Danbury, Conn.

[21] Appl. No.: 454,677

[22] Filed: Dec. 30, 1982

[51] Int. Cl.³ .................... A22C 13/00; F16L 11/00
[52] U.S. Cl. ........................................ 17/1 R; 17/41; 138/118.1; 428/36
[58] Field of Search ............................ 17/1 R, 41, 42; 138/118.1; 428/36

[56] References Cited

U.S. PATENT DOCUMENTS

| | | |
|---|---|---|
| 1,928,910 | 10/1933 | Riemenschneider . |
| 1,991,455 | 2/1935 | Gottwald . |
| 2,522,194 | 9/1950 | Richardson . |
| 2,522,195 | 9/1950 | Richardson . |
| 2,551,871 | 5/1951 | Briggs . |
| 2,825,588 | 3/1958 | Howard .............................. 285/258 |
| 3,207,534 | 9/1965 | Kimbrell et al. ...................... 285/55 |
| 4,142,843 | 3/1979 | Kish .................................... 417/313 |
| 4,269,438 | 5/1981 | Ridenour .......................... 285/382.2 |

Primary Examiner—William R. Dixon, Jr.
Attorney, Agent, or Firm—John R. Doherty

[57] ABSTRACT

A food casing article includes a hollow tubular core casing carrier provided with a casing retention element for holding the casing a predetermined distance from a connection means employed at one end of the tubular casing carrier, the retention element being formed by compressing together a part of a thermoplastic tube while softened to form an annular, double-walled flange extending outwardly from around the side walls of the tube.

8 Claims, 13 Drawing Figures

SYNTHETIC FOOD CASING ARTICLE EMPLOYING A RIGID HOLLOW TUBULAR CORE MEMBER WITH INTEGRAL CASING RETENTION ELEMENT

TECHNICAL FIELD

The present invention relates to synthetic food casing articles and more particularly to food casing articles of the type wherein a shirred cellulosic food casing is compacted onto a rigid hollow tubular core member. According to one aspect of the present invention, the rigid hollow tubular core member supports the shirred cellulosic casing and also serves as a tension sleeve for use in conjunction with a conventional automatic food stuffing apparatus. In such an application, the tension sleeve is provided with a flanged end which is adapted to connect to a slacking mechanism on the stuffing apparatus. The tension sleeve is provided with a casing retention element for holding the casing length a predetermined distance from the flanged end. According to another aspect of the present invention, the hollow tubular core member may also be utilized as the stuffing horn in a stuffing apparatus. In such application, the flanged end of the tubular core member is utilized to connect the combined food casing article and stuffing horn to the stub of the stuffing apparatus. The tubular core member is also provided with a retention element for holding the food casing a predetermined distance from the flanged end thereby facilitating attachment of the tubular core member to the stuffing apparatus. In small size (frankfurter size) casings which are ordinarily shirred and highly compressed onto hollow tube cores, the flanged end of the tubular core is particularly useful for retaining the casing on the tubular core and thereby preventing longitudinal expansion after compression.

In addition, the present invention relates to a method of forming a radially outwardly extending, annular flange around the side walls of a rigid, thin wall, thermoplastic tube. The thermoplastic tube so formed with the annular flange is useful in the manufacture of food casing articles described herein.

BACKGROUND ART

Artificial food casings used throughout the world in processing a great variety of meat and other food products, such as sausages of various types, cheese rolls, turkey rolls, and the like are customarily prepared from regenerated cellulose and other cellulosic materials. Casings are of several different types and sizes to accommodate different categories of food products to be prepared. They are normally made in long lengths and then shirred and compacted by conventional methods to form a so-called casing stick for use in a stuffing apparatus. The food product, e.g., meat, to be packaged is ordinarily prepared in the form of an emulsion which is stuffed into a deshirred casing on the stuffing apparatus. The food product is processed while it is encased and may be stored and shipped in the casing, though in many instances, particularly with small sausage products, such as frankfurters, the casing is removed from the food product after completion of the processing.

Shirring techniques for food casings are well known in the art. Generally, these techniques involve the continuous feeding of a given length of flat casing feed stock from a reel or other supply into a shirring machine, about a shirring mandrel, where it is inflated with low pressure gas, (e.g. air) and lubricated internally and externally. The inflated and lubricated casing is then passed through an array of shirring rolls which pleat the casing up against a restraint on or about the shirring mandrel until a preselected shirred length has been attained. The shirred casing is then transferred past or away from the restraint against which the shirring was performed and onto an extended mandrel portion whereon it is compacted into a desired stick length.

It has been the goal of food casing manufacturers to produce a casing stick which can be shirred and continuously stuffed on a stuffing apparatus with no mechanical defects or breakdowns so as to insure continuous production. The casing sticks so produced should also have sufficient structural and mechanical integrity to withstand the ordinary rigors of packaging, storage, handling and placement on the stuffing apparatus. It has been furthermore desirable to compact as much stuffable casing into a given stick length as is possible, to produce a shirred casing stick having a high pack ratio with a large internal bore, as evidenced by a high packing efficiency (0.50 and greater).

These goals have been attained to a great extent by recent major developments in the synthetic food casing industry. One such development is disclosed and claimed in the co-pending application Ser. No. 363,851 of Mahoney et al, filed on Apr. 5, 1982, wherein a casing article comprises a central substantially rigid hollow tubular core on which the casing is shirred and compressed. It has been found that significantly higher packing efficiencies are possible with this newly developed cored shirred casing stick article as compared to conventional casing articles of the prior art. Cored casing stick articles are prepared with a wide range of casing sizes, from frankfurter size (15–40 mm diameter) to larger size cellulosic and fiber-reinforced cellulosic casings (40–200 mm).

In the co-pending application Ser. No. 273,180 of Beckman et al, filed on June 12, 1981, there is also disclosed and claimed a further development of this cored high density shirred casing stick concept wherein the core itself is employed as an element of the stuffing system in which the article is incorporated. Specifically, the core of the shirred casing article is employed as a reciprocally movable tension sleeve on a conventional automatic stuffing apparatus. To this end, the rigid hollow tubular core is provided with a means for operably connecting the tension sleeve to a slacking mechanism on the stuffing machine.

In addition to the connection means, the hollow tubular core is further provided with a shoulder element disposed between the end of the compacted casing and the connection means itself. The purpose of the shoulder element is to retain the end of the shirred casing in spaced relationship from the connection means at one end of the tubular core and to facilitate the operable connection of a slacking mechanism on the stuffing apparatus.

Specifically, the means for connecting the tension sleeve to a slacking mechanism may constitute an annular flange formed integrally at one end of the hollow tubular core. The shoulder element for spacing the shirred casing from the connection means may be provided simply by forming a bell or bell shape at the same end of the hollow core. During assembly of a casing article as described above, the shirred casing is forcibly moved along the length of the hollow core until it reaches the shoulder element formed by the bell or bell shape which acts as a stop. In order to obtain a high packing ratio or density, a longitudinal force is applied to the shirred casing in order to compact the casing on the tubular sleeve. This force is transferred to the hollow tubular core which is supported at the same end where the shoulder or bell is formed. Consequently, the shoulder or bell is required to withstand all of the mechanical stress applied to the hollow core during the compaction operation. Since the hollow tubular core is ordinarily made from a relatively thin wall plastic tube having limited capacity to withstand these stresses, the tube sometimes deforms or even ruptures at the shoulder or bell during assembly of the casing articles.

It is therefore an important object of the present invention to provide an improved food casing article of the type wherein a shirred food casing is compacted onto a rigid hollow tubular core member serving as a casing carrier.

Another object of the present invention is to provide such an improved food casing article employing a casing retention element which can be formed quite easily during shaping of the hollow tubular core member with little or no additional expense and which acts at the same time as a reinforcement for the tube against deformation or rupture upon compacting the shirred casing onto the hollow tubular core member.

Another object of the present invention is to provide such an improved food casing article employing a rigid, thin wall, plastic, hollow tubular core member formed with a radially outwardly extending, annular flange which serves as a casing retention element.

Still another object of the present invention is to provide an improved method of forming a radially outwardly extending, annular flange around the side walls of a rigid, thin wall, thermoplastic tube suitable for use as a hollow tubular core in food casing articles.

DISCLOSURE OF INVENTION

In accordance with the present invention, there is provided an improved synthetic food casing article comprising, in combination:

a substantially rigid, thin wall, hollow, thermoplastic, tubular core member serving as casing carrier;

means at one end of the hollow, tubular core member for operably connecting the tubular core member to a stuffing apparatus;

a cellulosic food casing length shirred and compacted onto the hollow tubular core member with an end of the casing being located in controlled close proximity to the connection means; and a casing retention element for holding the casing length a predetermined distance from the connection means, the retention element consisting of an annular, double-walled, flange extending outwardly from around the side walls of the hollow tubular core member, the flange being integral with adjacent sections of the hollow tubular core member, the adjacent sections being of substantially equal diameter and being substantially axially aligned longitudinally with one another such that each section reinforces the other against longitudinal stress applied to the hollow tubular core member when the casing length is forcibly compacted thereon.

According to one aspect of the present invention, the rigid hollow tubular core member employed in the casing article may be utilized as a tension sleeve for a conventional automatic food stuffing apparatus. The tension sleeve employs an annular flange extending radially outwardly from the end of the sleeve for connecting the sleeve to a reciprocally operable slacking mechanism. However, any other structure functionally equivalent to the annular flange may also be used in the casing article.

According to another aspect of the present invention, the rigid hollow tubular core member may be utilized as a stuffing horn in a stuffing apparatus. In this application, the tubular core member may be formed at one end with a bell shaped shoulder or the like for connecting the horn onto the outlet end of the stuffing apparatus.

The synthetic cellulosic food casing employed in the casing article of the present invention may be basically the same material as that disclosed and claimed in the co-pending application Ser. No. 363,851, supra, i.e., the casing may have a controllable moisture content of from about 16 percent or less to about 35 percent by total casing weight. In addition, the casing is preferably shirred and compacted on the hollow tubular core to a packing efficiency greater than the packing efficiency of the same casing shirred and compacted under the same shirring and compacting conditions without the core, the core at the same time having an outer circumference at least as great as the inner bore circumference the same casing would have when shirred and compacted under the same shirring and compacting conditions without the core.

The rigid hollow tubular core member used in the casing article may vary in wall thickness to suit the particular casing article and its adaptation and utilization in conventional stuffing apparatus. For example, the wall thickness of a hollow tubular core member used as a tension sleeve generally should be in the range of from about 0.020 inch (0.08 cm.) to about 0.080 inch (0.20 cm.).

The cored high density, shirred casing article of the present invention may also employ a casing sizing element mounted on the tubular core member and disposed interiorly of an unshirred portion of the shirred casing. Such means may include, for example, a sizing disc which is preferably provided with a circumferential rim.

The present invention also contemplates an improved method of forming an outwardly extending, annular flange around the side walls of a substantially rigid, thin wall, thermoplastic tube, which comprises:

applying heat substantially uniformly around a portion of the thermoplastic tube in order to soften the tube while maintaining another portion of the tube in substantially rigid form;

holding a section of the softened tube in a substantially fixed position so as to prevent movement of the same in either the longitudinal or radial direction;

supporting another section of the softened tube against movement in a radial direction at a location spaced from the first-mentioned section while at the same time leaving an intermediate section of the softened tube unsupported and free to move in both the longitudinal and radial direction;

applying a force on the rigid portion of the tube sufficient to cause the supported softened section of the tube to move in a longitudinal direction toward the fixed section of the softened tube while at the same time allowing the unsupported, intermediate section of the softened tube to extend outwardly around the circumference of the tube;

compressing together the outwardly extending, unsupported, intermediate section of the softened tube so as to form an annular, double-walled flange, and allowing the so-formed, softened tube to cool and harden while maintaining its shape.

According to a preferred mode of practicing the present invention, a pressurized fluid is introduced inside the softened tube prior to applying a force on the rigid portion of the tube so as to inflate the unsupported intermediate section of the tube and cause the same to bulge outwardly in a substantially uniform manner around the circumference of the tube.

DETAILED DESCRIPTION

Figure 1:
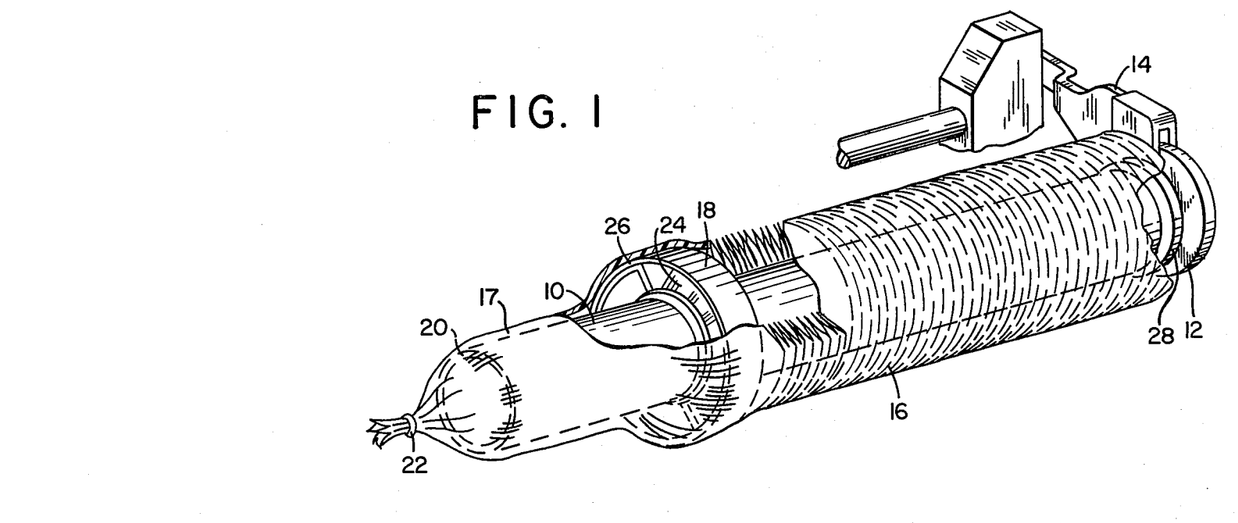
FIG. 1 is a perspective view of a typical cored, high density, shirred casing stick tension sleeve article in accordance with the present invention showing part of the slacking mechanism on a stuffing machine.

There is illustrated in detail in FIG. 1 a typical synthetic food casing article in accordance with the present invention wherein a tension sleeve element is used as a casing carrier to be slipped over a stuffing horn and attached to a slacking mechanism on a stuffing machine.

As shown in the illustrated embodiment of a casing article, a rigid tubular casing carrier core or tension sleeve 10 is provided at one end with an annular flange 12 for connecting the tension sleeve to a reciprocally movable slacking mechanism 14 on a stuffing machine which except for the slacking mechanism, is not otherwise shown.

A shirred and compacted casing length 16 is disposed on the tension sleeve with one end in close proximity to the flange 12. The other end 17 of the casing length 16 is partially deshirred, and pulled over a sizing disc 18 and the unflanged end 20 of the tension sleeve 10. The deshirred casing length 17 is then closed at this end 20 with a clip 22. The shirring and compaction of the casing length 16 is accomplished in accordance with the description provided in co-pending application Ser. No. 363,851, the teachings of this application with regard to cored high density shirring being incorporated herein by reference.

Sizing disc 18, as shown, is an annular cup-shaped disc mounted on the tension sleeve 10 with a leg portion 24 extending radially outwardly from the outer surface of the tension sleeve 10 to a circumferential rim 26 over which the deshirred portion of casing length 17 is pulled.

In order to accommodate and facilitate connection of the tension sleeve 10 to the slacking mechanism 14 via the flange 12, a casing retention element is provided in the form of a separate annular flange 28 around the side wall of the tubular tension sleeve 10 and extending radially outwardly therefrom. As shown in greater detail in FIG. 2a, this flange 28 is formed integrally with the tension sleeve 10 by crimping a portion of the sleeve while heat softened to form a double-walled flange element in a manner to be hereinafter described in greater detail. It will be noted in particular that the flange 28 is spaced apart from the end flange 12 on the tension sleeve 10 so as to hold the shirred and compacted casing length 16 at a controlled predetermined distance therefrom. This enables the slacking mechanism 14 to be easily attached to the end flange 12 and also enables the whole mechanism to function properly without interference from the casing length 16.

Figure 2A:
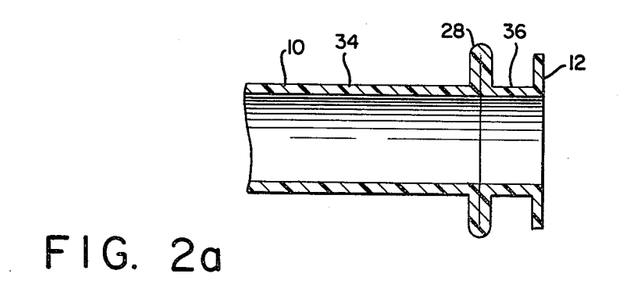
FIG. 2a is a cross-sectional view of a portion of the hollow tubular core used in the casing article shown in FIG. 1.
Figure 2B:
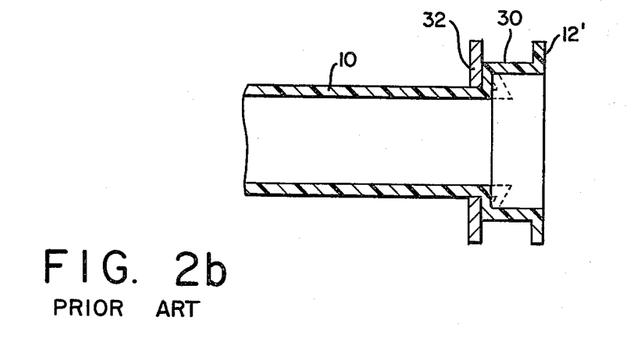
FIG. 2b is a similar view of substantially the same portion of a hollow tubular core used in casing articles of the prior art, the tubular core being formed with a shoulder or bell shaped end to provide a means for holding the casing in space relation from the annular flange provided at the end of the tube for connecting the tubular sleeve to the slacking mechanism.

FIG. 2b shows a tension sleeve 10 employing a shoulder or bell 30 according to the prior art. A separate annular disc 32 is also shown placed against the shoulder or bell 30 in order to further aid in holding the end of the shirred casing length 16 away from the end flange 12 and slacking mechanism (see FIG. 1).

Although this type of tension sleeve is easily made by simply forming or welding on the shoulder or bell at the end of a softened thermoplastic tube, it does have serious shortcomings which limit its use. For example, the shoulder area may at times distort or even rupture when the casing 16 is compacted onto the sleeve during manufacturing. The longitudinal forces that are applied to the casing 16 in order to compact the casing along the length of the tubular sleeve 10 are transferred through the casing and by friction directly onto the sleeve. This results in high stresses developing in the area of the shoulder or bell (the tension sleeve is usually supported and held stationary at this end during the casing assembly). These high stresses may cause the tension sleeve to distort along the longitudinal direction and radially inward at the shoulder or bell as indicated by the phantom lines in FIG. 2b or even to burst in extreme cases. Distortion of the tension sleeve 10 can be a serious problem. It can reduce the effective tubular sleeve diameter to a point where the casing article will not slide over a stuffing horn and/or the length of the tension sleeve can be shortened such that the stuffing machine requirement is not met.

Referring again to FIG. 2a, it will be readily seen that the shortcomings of prior tension sleeve structures are effectively overcome by employing the improved casing retention element in accordance with the present invention. As described hereinabove, the retention element is formed by crimping a portion of a thermoplastic tube while heat softened to form a double-walled flange element 28 around the side walls of the tube. It will be noted that during this forming operation the tubular sleeve 10 is divided into essentially two sections 34 and 36 by the flange 28. These two sections are maintained in longitudinal axial alignment with one another so that there is no discontinuity along the internal length of the tube except for the double-walled flange itself. Thus when longitudinal forces are transferred by friction from the casing 10 along the forward section 34 of the tension sleeve, these forces are opposed by the rear section 36 of the sleeve which acts as a reinforcement. The two sections 34 and 36 must of course be substantially the same size, i.e. equal diameter, and must be maintained in longitudinal axial alignment with one another, otherwise the same sort of distortion as described previously for the prior art configuration will occur. It will also be noted that the double wall flange element 28 adds strength and rigidity to the tension sleeve 10 in the area where the connection is made to the slacking mechanism.

The method of forming an annular flange around the side walls of a rigid, thermoplastic tube will now be described in greater detail with particular reference to FIGS. 3-9. A thermoplastic tube such as, for example, a polyethylene or rigid polyvinyl chloride tube is first cut to a length which is slightly greater than the length of the finished tube or tension sleeve 10. For convenience sake, the stock tube will be identified hereinafter by the same reference numeral used for the tension sleeve 10.

The tube 10 is heated to an elevated temperature along a portion of the tube extending from one end to at least about the desired location of the annular flange in order to soften the tube and enable it to be reshaped under pressure. The length of tube to be heated must include that portion of the tube which forms the annular flange. A suitable elevated material temperature for this purpose in the case of a rigid polyvinyl chloride tube is about 100° C., for example.

Figure 3:
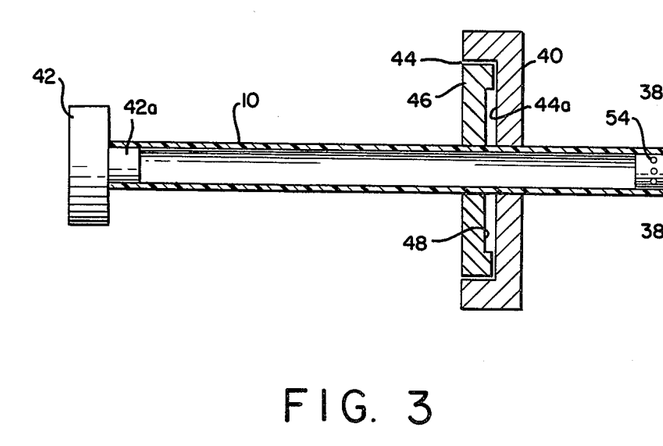
FIG. 3 is a cross-sectional, elevational view of an apparatus used to form a radially outwardly extending, annular flange around the side walls of a rigid, thin wall, thermoplastic tube in accordance with the present invention.

The softened tube 10 is then transferred to a reshaping apparatus which includes a male and a female die member 38 and 40, respectively, and a movable backstop 42. In the start position, as illustrated in FIG. 3, the female die member 40 is spaced from the male die member 38 with the softened tube 10 inserted through a central opening in the female die 40. The softened end of the tube is inserted over a hollow tubular support 38a on the male die while the opposite, rigid end of the tube 10 is supported on a cylindrical dowel 42a provided on the backstop 42.

The female die member 40 is formed with a recess or opening 44 on one side opposite the male die member 38. A clamp 46 also surrounds the tube 10 and is sized to fit easily inside the recess or opening 44 on the female die member 40. Both the female die 40 and clamp 46 are movable longitudinally in either direction along the length of the tube 10 and each is movable separately or independently of the other.

The apparatus described above may be advantageously employed to form an annular end flange 12 on the tube 10 for connecting the tubular sleeve to a slacking mechanism. This is accomplished by moving both the female die member 40 and clamp 46 to a position just short of the end of the tube 10 (see FIG. 4). The two are held stationary at this point and the male die 38 is then moved in a direction toward the female die 40. It will be seen that by this action the unsupported, softened end of tube 10 is forced outwardly in a radial direction by the flat facial surface 38b on the male die to form an annular end flange 12. It will be noted of course that the size or diameter of the end flange will be determined by the position of the female die 40 along the length of the tube 10.

Figure 4:
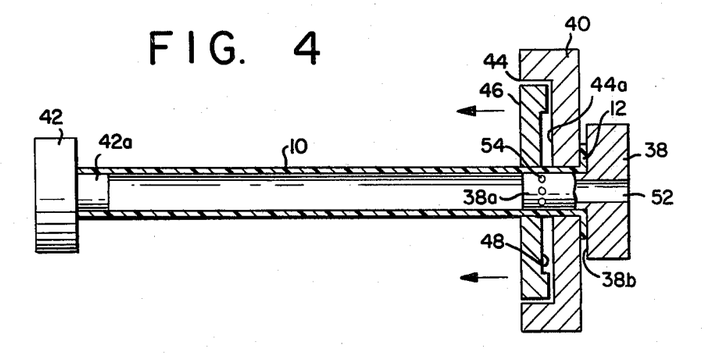
FIG. 4 is a similar view of the apparatus showing the manner in which the apparatus may be employed to form the annular flange at one end of the tube for connection to the slacking mechanism.
Figure 5:
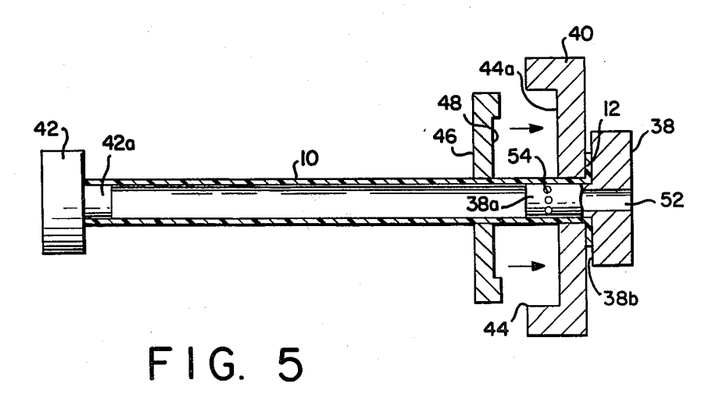
FIGS. 5–9 inclusive, are similar views of the apparatus showing the various steps involved in forming the annular, double-walled flange around the side walls of the tube according to the present invention.

During the following opertions for forming the annular double-walled retention flange 28 on the tube 10, both the male and female die members 38 and 40 are held stationary in the position shown in FIG. 4 along with the previously formed end flange 12 and adjoining section of the softened tube 10. This section of the tube 10 is supported by the female die member 40 against movement in either the longitudinal or radial direction. The clamp 46 is then withdrawn from inside the female die member 40 as shown in FIG. 5.

The clamp 46 is positioned along the length of the softened tube 10 at a predetermined location such that the distance between the flat surface 44a within female cavity 44 and the mating flat surface 48 of clamp 46 (i.e., distance A in FIG. 6) is equal to approximately twice the size or radial width of the double wall flange to be formed.

Figures 6, 7, 8, 9:
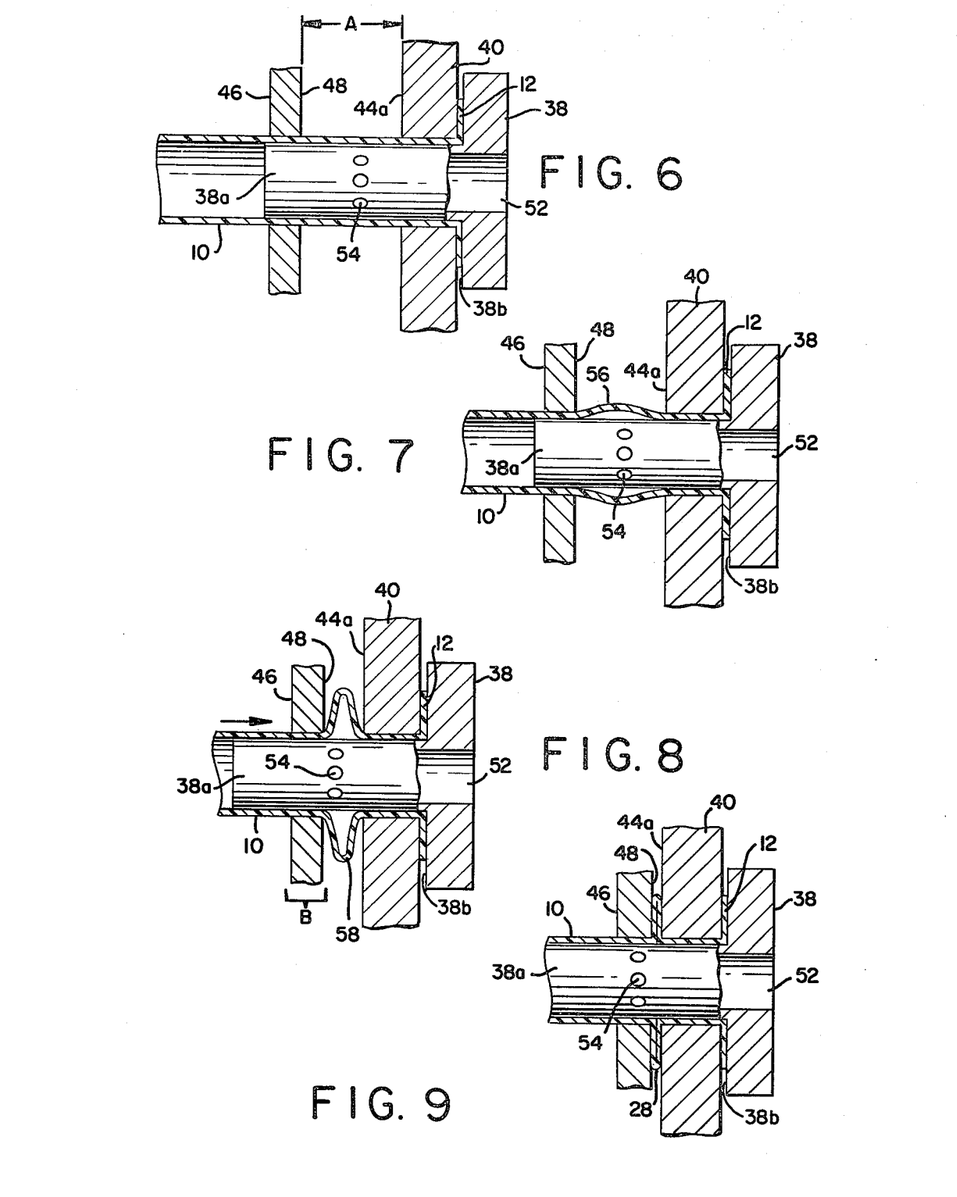

A pressurized fluid such as air under 20 to 80 psi pressure (dependent on type and thickness of tube material used) is introduced inside the male die member 38 via a central passageway 52 which communicates with the hollow tubular support 38a. The support 38a includes a circumferential row of apertures 54 which are located approximately at the mid-point between the female die 40 and the clamp 46, with clamp 46 in the open position (FIG. 6). The pressurized air entering the hollow tubular support 38a exerts a substantially uniform pressure circumferentially against the inner wall of the softened tube 10 via the row of apertures 54. This internal pressure causes the softened tube 10 to bulge at least slightly outwardly and uniformly around the entire outer circumference of the tube 10 as depicted at 56 in FIG. 7.

With the tube 10 bulging as described above, the backstop 42 supporting the unsoftened, rigid part of the tube 10 is moved in a longitudinal direction along with the clamp 46 toward the stationary male and female die members 38 and 40. A mechanism (not shown) is provided for moving the clamp 46 in unison with both the backstop 42 and softened tube 10. It will be seen then that by this action the clamp 46 supports one section of the tube 10 against movement in a radial direction only while the tube moves toward the male and female die members 38 and 40. This section of the tube 10 is indicated at B in FIG. 8.

Movement of the softened tube section B while supported in the radial direction by the clamp 46 causes the bulge around the tube 10 to extend radially outwardly and to form an annular crimp as shown at 58 in FIG. 8. It will be noted in particular that during this operation the softened tube section B is further supported internally by the outward end of the tubular extension 38a on the male die member 38. It will also be noted that the tubular extension 38a guides the softened tube as it moves in the longitudinal direction and assures axial alignment of the two sections 34 and 36 of the finished tubular articles as illustrated in FIG. 2a. The pressurized air is preferably maintained via the apertures 54 and the male die 38 during the crimping operation in order to assure uniformity in the crimp 58.

The clamp 46 continues to move longitudinaly along the tubular extension 38a together with the softened tube 10 and compresses the crimp to form the annular double-walled flange 28 as shown in FIG. 9. The softened tube 10 is then allowed to cool with the formed flange 28 held stationary between the clamp and female die surfaces 48 and 44a. It will also be noted that the two sections 34 and 36, on each side of the annular flange 28 are held in longitudinal axial alignment by the tubular extension 38a during the cooling step.

Tension sleeves or casing carriers may be made by the above method using a number of thermoplastic materials such as rigid polyvinyl chloride, an acrylonitrile-butadiene-styrene copolymer (ABS), or high density polyethylene, for example.

The wall thickness of the tension sleeve should be in the range of about 0.020 inch (0.08 cm.) to about 0.060 inch (0.15 cm.) in the case where rigid polyvinyl chloride tubes are employed. If tubes of high density polyethylene are used to make the sleeves, then the wall thickness may be about 0.020 inch (0.08 cm.) to about 0.080 inch (0.20 cm.).

Figure 10:
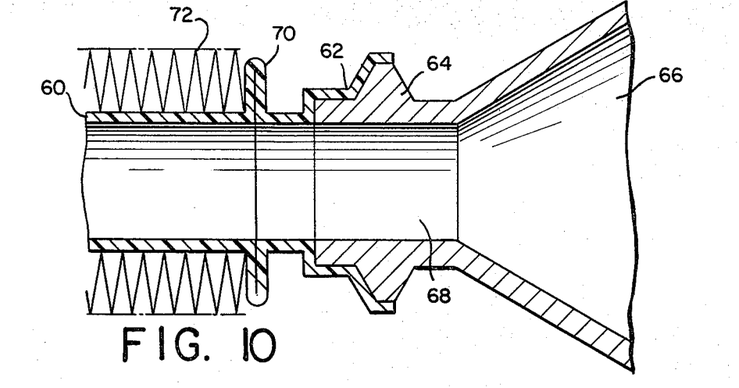
FIG. 10 is a cross-sectional view of a portion of a hollow tubular core used in a shirred casing stuffing horn article according to the present invention.

A synthetic food casing article employing a tubular core casing carrier according to the present invention and adapted for use as a stuffing horn in a stuffing apparatus is shown in FIG. 10. The casing article is similar to the tubular tension sleeve article described earlier except that the end of the tubular core 60 is formed with a bell shaped shoulder 62 for attaching the casing article onto the outlet nozzle 64 of a stuffing chamber 66. The bell shaped shoulder 62 conforms exactly to the outside contour of the nozzle 64 so that the tubular stuffing horn 60 when attached is assured of proper alignment with the nozzle bore 68. A clamp fitting (not shown) is mounted around the shoulder 62 and holds the tubular core tightly in place on the end of the nozzle.

The casing retention element is formed on the tubular core 60 in the same manner as described above by crimping a portion of the tube while heat softened to form an annular, double-walled flange 70 extending outwardly from around the side walls of the tube. This annular flange 70 may be formed on the tube using the same apparatus as shown in FIGS. 5–9.

It should be pointed out in connection with this embodiment of the tubular core that the position of the annular flange 70 in close proximity to the bell shaped shoulder 62 in addition to retaining the end of the shirred casing 72, also serves to strengthen and stabilize the end of the tubular core 60 at or near the point where the tube is attached to the nozzle.

Figure 11:
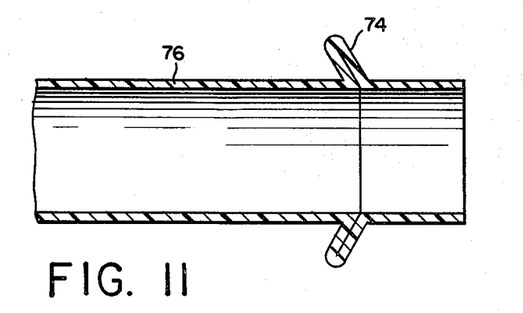
FIG. 11 is a similar view of a hollow, tubular core formed with an annular flange extending radially outward at an angle with respect to the longitudinal axis of the tubular core according to a modification of the present invention.

FIG. 11 shows a modification of a tubular core casing carrier according to the present invention wherein an annular, double-walled flange 74 extends outwardly from around the side walls of a tubular core 76. In this case, however, the flange 74 extends radially outward at an angle (e.g. about 60 degrees) with respect to the longitudinal axis of the tube. It may be desirable to employ this modification in a number of applications such as, for example, in those cases where a relatively large diameter shirred casing is compacted onto a hollow tubular core. The inclined annular flange tends to more readily prevent the larger diameter shirred casing from slipping over the retention element.

Figure 12:
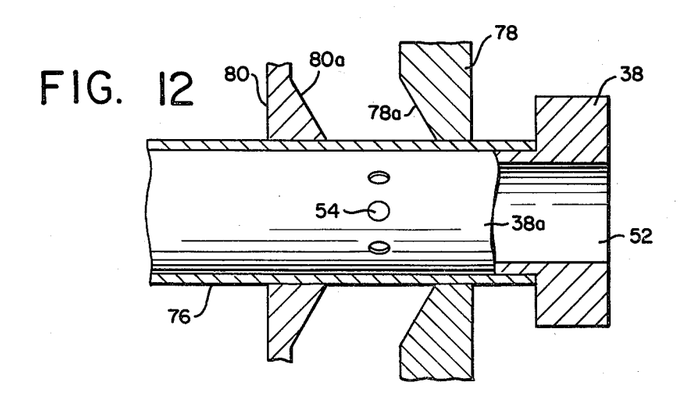
FIG. 12 is a cross-sectional, elevational view of apparatus used to form the radially outward extending annular flange around the side walls of the tubular core shown in FIG. 11.

The hollow tubular core casing carrier described hereinabove may be formed using a modified apparatus as illustrated in FIG. 12. The modified apparatus is basically the same as the apparatus described earlier except that the female die member 78 and the clamp 80 employ complementary crimp-forming facial surfaces 78a and 80a, respectively, which are each offset at the same angle with respect to the longitudinal axis of the tube as may be desirable for the annular, double-walled flange 74. It will of course be evident that operation of the modified apparatus may be carried out in basically the same manner as that described for the apparatus shown in FIGS. 3–9.

A great many thermoplastic tubes have been successfully formed with a radially outwardly extending annular flange according to the method described above. These tubes have been employed as tension sleeves in cored high density shirred casing articles and have performed satisfactorily without evidence of any interference by the casing. In addition, there has been no evidence of any tube deformation in the area of the casing retention element due to forces exerted on the tube when the casing has been applied.

I claim:

1. A casing article comprising, in combination:
   a substantially rigid, thin wall, thermoplastic, hollow tubular core member serving as a casing carrier;
   means at one end of said hollow tubular core member for operably connecting said tubular core member to a stuffing apparatus;
   a cellulosic food casing length shirred and compacted onto said hollow tubular core member with an end of said casing being located in controlled close proximity to said connection means; and
   a casing retention element for holding said casing length a predetermined distance from said connection means, said retention element consisting of an annular, double-walled, flange extending outwardly from around the side walls of said hollow tubular core member, said flange being integral with adjacent sections of said hollow tubular core member, said adjacent sections being of substantially equal diameter and being substantially axially aligned longitudinally with one another such that each section reinforces the other against longitudinal stress applied to said hollow tubular core member when said casing length is forcibly compacted thereon.

2. A casing article according to claim 1 wherein the hollow tubular core member is utilized as a tension sleeve and wherein the means for operably connecting said hollow tubular core member comprises an annular flange extending radially outwardly from the end of said tubular core member for engagement with a reciprocally operable slacking mechanism on a stuffing apparatus.

3. A casing article according to claim 1 wherein the hollow tubular core member is utilized as a stuffing horn and wherein the means for operably connecting said hollow tubular core member comprises a bell shaped shoulder and flange formed at the end of said tubular core member for attachment to the outlet nozzle of a stuffing apparatus.

4. A casing article according to claim 1 further including a casing sizing means mounted on the tubular core member proximate to the opposite end of said member and disposed internally of an unshirred portion of said shirred casing length.

5. A casing article according to claim 4 wherein said sizing means is a sizing disc.

6. A casing article according to claim 1 wherein the packing efficiency is not less than about 0.50.

7. A casing article according to claim 1 wherein the tubular core member is made from rigid polyvinyl chloride, acrylonitrile-butadiene-stryrene copolymer or high density polyethylene.

8. A casing article according to claim 1 wherein the tubular core member has a wall thickness in the range of from about 0.020 to about 0.080 inch.

* * * * *